UNITED STATES PATENT OFFICE.

MARC DARRIN, OF WILKINSBURG, PENNSYLVANIA, ASSIGNOR TO THE KOPPERS COMPANY, OF PITTSBURGH, PENNSYLVANIA, A CORPORATION OF PENNSYLVANIA.

TURPENTINE SUBSTITUTE.

1,340,600. Specification of Letters Patent. Patented May 18, 1920.

No Drawing. Application filed May 8, 1919. Serial No. 295,761.

*To all whom it may concern:*

Be it known that I, MARC DARRIN, a citizen of the United States, residing at Wilkinsburg, in the county of Allegheny and State of Pennsylvania, have invented a new and useful Improvement in Turpentine Substitutes, of which the following is a full, clear, and exact description.

My invention relates to turpentine substitutes and more especially to a turpentine-like product derived from benzol oils and possessing not only an odor, appearance, color, boiling point, volatility and drying properties, such as are characteristic of turpentine, but it also possesses solvent properties for the various gums and resins used in paints and varnishes, almost identical to that of the pure gum spirits of turpentine.

This product is different from the so-called turpentine substitutes which are ordinarily made up from petroleum distillants. Such turpentine substitutes are really only thinners and adulterants in so far as their solvent properties are concerned, as it is a well known fact that resins and gums such as kauri, copal, etc., might be thrown down from solution in varnishes and paint compositions when thinned with petroleum turpentine substitutes, and for this reason it is always necessary for the varnish and paint manufacturers to incorporate a certain amount of the real turpentine spirits into their composition.

It is usually possible to thin down paints and varnishes to a certain extent with the cheaper substitutes made up from petroleum distillants above referred to. It is, however, not an object of this invention to produce such a turpentine substitute which can be used merely as a thinner, since the turpentine substitute hereinafter described serves to actually replace the pure spirits of turpentine which are required in all good paints and varnishes.

I have discovered that a very satisfactory turpentine substitute may be made from a mixture of benzol oils, technically known as pure solvent naphtha, incorporated with certain proportions of an oxidized turpentine oil. Such an oxidized turpentine oil may be produced by any of the well known processes such as blowing with air, treating with oxidizing agents, nitric acid, or the like. I have been able to produce turpentine substitutes answering in all respects the requirements of the real spirits of gum turpentine by the employment of the following proportions which may be varied within rather wide limits; 5% to 30% oxidized turpentine oil and 70% to 95% pure solvent naphtha, by volume.

Of course this material can be mixed in any proportion with other turpentines, either the pure spirits or the wood distilled product, without departing from the essence of this invention. It is sometimes very desirable to mix this turpentine-like material with wood turpentine, either steam distilled or destructively distilled, since turpentines derived in this manner often have a slightly unpleasant empyromatic odor which is balanced by the aromatic odor which is possessed by the benzol oils. Instead of turpentine, other oils obtained from the distillation of wood may be used. These oils are those usually recovered by the destructive distillation of wood and have somewhat similar characteristics to turpentine.

My turpentine substitute may also be blended to a certain extent with other grades of solvent naphtha or benzol oils, either in a pure or partially refined condition. It is also understood that small amounts of certain other hydrocarbon oils and driers may be added to this mixture without departing from the spirit of my invention.

I claim:

1. A turpentine substitute consisting of solvent naphtha and an oxidized turpentine.

2. A turpentine substitute containing solvent naphtha, an oxidized turpentine and turpentine.

3. A turpentine substitute containing solvent naphtha, an oxidized turpentine and a turpentine obtained from the distillation of wood.

4. A turpentine substitute containing solvent naphtha, an oxidized turpentine and a turpentine obtained from the destructive distillation of wood.

5. A turpentine substitute containing solvent naphtha, oxidized turpentine and an oil obtained from the distillation of wood.

6. A turpentine substitute containing solvent naphtha, oxidized turpentine and an oil obtained from the destructive distillation of wood.

7. A turpentine substitute containing a mixture of about 5 to 30 per cent. oxidized turpentine and 70 to 95 per cent. solvent naphtha.

In testimony whereof I have hereunto set my hand.

MARC DARRIN.